(12) United States Patent
Shimakawa et al.

(10) Patent No.: US 7,650,109 B2
(45) Date of Patent: Jan. 19, 2010

(54) ANALYZING SYSTEM, ANALYZING METHOD USING THE SAME, AND SYSTEM FOR COLLECTING SURVEY RESULTS FOR USE IN ANALYSIS

(75) Inventors: Toshihiko Shimakawa, Tokyo (JP); Norikazu Takashima, Tokyo (JP)

(73) Assignee: Japan Tobacco Inc., Tokyo (JP)

( * ) Notice: Subject to any disclaimer, the term of this patent is extended or adjusted under 35 U.S.C. 154(b) by 514 days.

(21) Appl. No.: 10/539,302

(22) PCT Filed: Dec. 26, 2003

(86) PCT No.: PCT/JP03/16984

§ 371 (c)(1), (2), (4) Date: Sep. 14, 2006

(87) PCT Pub. No.: WO2004/059547

PCT Pub. Date: Jul. 15, 2004

(65) Prior Publication Data

US 2007/0141976 A1    Jun. 21, 2007

(30) Foreign Application Priority Data

Dec. 26, 2002    (JP) .............................. 2002-378654

(51) Int. Cl.
*H04H 60/21*    (2008.01)
*H04H 60/33*    (2008.01)
*H04H 60/61*    (2008.01)

(52) U.S. Cl. ................ 455/2.01; 455/404.2; 455/414.2; 455/414.4; 702/136; 705/11; 705/32; 705/35; 709/213; 709/224

(58) Field of Classification Search ................ 455/2.01, 455/404.2, 414.2, 414.4; 705/11, 31, 32, 705/35; 708/139; 702/136
See application file for complete search history.

(56) References Cited

U.S. PATENT DOCUMENTS 6,304,851 B1    10/2001    Kmack et al.

(Continued)

FOREIGN PATENT DOCUMENTS

JP    4-307657 A    10/1992

(Continued)

OTHER PUBLICATIONS

Pendragon Software Corporation: "Pendragon Form 3.1" Internet Article Apr. 2000, XP002393717.*

(Continued)

*Primary Examiner*—Lana N Le
*Assistant Examiner*—Ping Y Hsieh
(74) *Attorney, Agent, or Firm*—Birch, Stewart, Kolasch & Birch, LLP

(57)    ABSTRACT

A surveyor carries a terminal device 200 and travels to a survey point preliminarily instructed. The surveyor obtains survey position information by using a GPS unit in the terminal device 200 at the survey point. The surveyor also photographs an object of a survey by using a camera in the terminal device 200 at the survey point. After completion of a series of surveys, the surveyor transmits survey results including the survey position information to an analyzing apparatus 100 by using the terminal device 200. The analyzing apparatus 100 determines reliability by using survey position information included in the survey results and carries out a predetermined analysis by using a survey result of high reliability. Consequently, a survey result of low reliability can be eliminated from objects to be analyzed.

20 Claims, 11 Drawing Sheets

U.S. PATENT DOCUMENTS

| | | | |
|---|---|---|---|
| 6,885,874 B2 * | 4/2005 | Grube et al. | 455/520 |
| 7,092,369 B2 * | 8/2006 | Fuccello et al. | 370/328 |
| 2002/0073196 A1 * | 6/2002 | Westervelt et al. | 709/224 |

FOREIGN PATENT DOCUMENTS

| | | |
|---|---|---|
| JP | 8-285700 A | 11/1996 |
| JP | 9-5421 A | 1/1997 |
| JP | 10-239119 A | 9/1998 |
| JP | 2002-15096 A | 1/2002 |
| JP | 2002-92291 A | 3/2002 |
| JP | 2002-373391 A | 12/2002 |
| WO | WO-98-10246 A | 3/1998 |

OTHER PUBLICATIONS

Ryan Nick et al.:"FieldNote: a Handheld Information System for the Field" Proceedings of Telegeo '99: First International Workshop on Telegeoprocessing May 6-7, 1999 Lyon France, 1999 XP002393716.

Pendragon Software Corporation:"Pendragon Forms 3.1" Internet Article Apr. 2000, XP002393717.

Portable Internet, Inc. "GPS Mobile Workforce Management" Internet Article, Nov. 13, 2002, XP002393718.

"Nanatsu no Keyword kara Kensho Gyomu Kaikaku o Jitsugen suru Jisedai Mobile Katsuyojutsu", Mobile Internet, Kabushiki Kaisha Ric Telecom, vol. 2, No. 17, Jun. 10, 2002, pp. 18 to 27.

* cited by examiner

Fig.4

| SHEET ID COLUMN | SURVEYOR ID COLUMN | PROVISION DATE/TIME COLUMN | START DATE/TIME COLUMN | TIME LIMIT DATE/TIME COLUMN | RECEPTION FLAG COLUMN |
|---|---|---|---|---|---|
| ... | ... | ... | ... | ... | ... |
| 1051 | 36112 | 2002/12/2 13:15 | 2002/12/1 8:00 | 2002/12/7 20:00 | 1 |
| 1030 | 36114 | 2002/12/3 10:10 | 2002/12/1 8:00 | 2002/12/7 20:00 | 0 |
| ... | ... | ... | ... | ... | ... |
| 2016 | 36113 | 2002/12/1 15:00 | 2002/11/15 8:00 | 2002/12/5 20:00 | 1 |
| ... | ... | ... | ... | ... | ... |

400 — SHEET ID COLUMN
402 — SURVEYOR ID COLUMN
404 — PROVISION DATE/TIME COLUMN
405 — START DATE/TIME COLUMN
406 — TIME LIMIT DATE/TIME COLUMN
408 — RECEPTION FLAG COLUMN

| 410 | 412 | 414 | 416 |
|---|---|---|---|
| SURVEYOR ID COLUMN | TERMINAL ID COLUMN | E-MAIL ADDRESS COLUMN | SURVEYOR NAME COLUMN |
| ... | ... | ... | ... |
| 36112 | AZ1156a | ○○@△△△.co.jp | Sato |
| 36113 | CP2613b | ××@○○.ne.jp | Sasaki |
| 36114 | Bb1126a | △△@×××.co.jp | Suzuki |
| ... | ... | ... | ... |

468
36112000.dat

450a — <SURVEY RESULT>
    <SURVEYOR ID> 36112 </SURVEYOR ID> —452
    <SHEET ID> 1051 </SHEET ID> —454
    <SURVEY DATE AND TIME>2002/12/2 15:05</SURVEY DATE AND TIME>—456
    <ITEM 1> $X_1, Y_1, H_1$ </ITEM 1> —458
    <ITEM 2> YES </ITEM 2> —460
    <ITEM 3> VERY HEAVY </ITEM 3> —462
    <ITEM 4> 20021221505_36112.jpg </ITEM 4> —464
    <ITEM 5> 20021221501_36112.jpg </ITEM 5> —466

450b — </SURVEY RESULT>

| SURVEYOR ID COLUMN 420 | SHEET ID COLUMN 422 | COLLECTION DATE/TIME COLUMN 424 | POSITION INFORMATION COLUMN 426 | SURVEY DATE/TIME COLUMN 428 | RESULT FILE NAME COLUMN 430 | RELIABILITY COLUMN 432 | ANALYSIS FLAG COLUMN 434 |
|---|---|---|---|---|---|---|---|
| ... | ... | ... | ... | ... | ... | ... | ... |
| 36112 | 1051 | 2002/12/2 15:07 | X1, Y1, H1 | 2002/12/2 15:05 | 36112○○○.dat | A | 1 |
| 20100 | 1051 | 2002/12/2 15:08 | X2, Y2, H2 | 2002/12/2 14:05 | 20100×××.dat | C | 0 |
| 35577 | 1051 | 2002/12/2 15:08 | X3, Y3, H3 | 2002/12/2 15:05 | 35577○○○.dat | A | 1 |
| 36112 | 1055 | 2002/12/2 15:30 | X4, Y4, H4 | 2002/12/2 15:15 | 36112△△△.dat | B | 0 |
| ... | ... | | | ... | | ... | ... |

| 470 SHEET ID COLUMN | 472 RELIABILITY DETERMINATION DATA ITEM COLUMN | 474 IDEAL VALUE COLUMN | 476 RELIABILITY VALUE COLUMN |
|---|---|---|---|
| ... | ... | ... | ... |
| 1051 | ITEM 1 (SURVEY POSITION INFORMATION) | ○○ SHOP POSITION $(x_0, y_0, h_0)$ | A: 0 TO 5, B: 5 TO 15 C: 15 OR LARGER |
| 1055 | ITEM 5 (SURVEY POSITION INFORMATION) | △△ SHOP POSITION $(x_1, y_1, h_1)$ | A: 0 TO 15, B: 15 TO 50 C: 50 OR LARGER |
| ... | ... | ... | ... |

126

ANALYZING SYSTEM, ANALYZING METHOD USING THE SAME, AND SYSTEM FOR COLLECTING SURVEY RESULTS FOR USE IN ANALYSIS

TECHNICAL FIELD

The present invention relates to an information collecting technique and an information analyzing technique and, more particularly, to a technique of collecting information via a network and carrying out a predetermined analysis on the basis of the collected information.

BACKGROUND ART

With development in the network technique, it became possible to transmit/receive contents such as text data, image data, sound data, and video data via a network. The function of transmitting/receiving contents via a network is provided for not only a stationary terminal device such as a desktop computer but also a portable terminal device such as a cellular phone or PDA (Personal Digital Assistants). Such terminal devices each having the network connecting function are widely spread and the number of terminal devices is enormous.

Generally, transmission/reception of information via a network can be performed in short time and at low price. In addition, the number of terminal devices each having the network connecting function is enormous, that is, a large amount of samples can be easily collected. There is consequently a system of sending a questionnaire and collecting answers by using a network (Patent document 1).

Patent document 1: Japanese Patent Laid-Open No. 2002-15096.

When the number of answers to a questionnaire is large, generally, variations occur in the quality of the answers due to, for example, an answer including a typing error, an answer of a person who answers the questionnaire not-seriously and insincerely, and the like. Consequently, if the answers are used as they are for an analysis, an adverse influence is exerted on the result of the analysis.

DISCLOSURE OF THE INVENTION

The present invention has been achieved in consideration of the problems and a feature is to provide a technique of collecting survey results from a plurality of terminal devices. Another feature is to provide a technique of carrying out a predetermined analysis on the basis of collected survey results. Further another feature is to provide a technique of instructing a survey to a surveyor having a terminal device. Further another feature is to provide a technique of determining reliability of a survey result. Further another feature is to provide a technique of improving quality of an analysis result.

A mode of the invention is an analyzing system of carrying out a predetermined analysis on the basis of a collected survey result. The system includes: a collecting unit for collecting a survey result of a pre-designated survey from a terminal device; a determining unit for determining reliability of the survey result on the basis of external environment information at a survey point and the survey added to the survey result by the terminal device; and an analyzing unit for carrying out a predetermined analysis on the basis of the collected survey result in consideration of the reliability. With the configuration, the system can carry out an analysis in consideration of the reliability of a survey result.

The analyzing unit may have: an extracting unit for selecting a survey result to be analyzed on the basis of the reliability; and an analyzing part for carrying out the analysis on the basis of the selected survey result. With the configuration, the analyzing unit can conduct an analysis on the basis of the survey result selected according to the reliability.

The external environment information may be survey position information specifying the position of the terminal device at the time point when the survey is conducted. Consequently, the determining unit can determine reliability of a survey result according to a position where the actual survey was conducted.

The survey may include survey target position information specifying a target point of a survey, and the determining unit may determine reliability of the survey result on the basis of the survey target position information and the survey position information. With the configuration, the system can determine reliability from the viewpoint that the survey result is actually obtained at a point where the survey is to be conducted.

When a plurality of survey results exist for the same survey, the extracting unit may select a survey result of high reliability. With the configuration, in the system, an analysis result of low reliability can be prevented from exerting an adverse influence on an analysis result, and a high-quality analysis can be carried out.

The system may further include a providing unit for transmitting the survey to the terminal device. Consequently, the system can transmit a new survey to a terminal device.

Another mode of the invention relates to a method of carrying out a predetermined analysis by using a system including an analyzing apparatus for carrying out an analysis on the basis of a survey result collected from a terminal device connected via a network. The method includes: a step of collecting a survey result of a pre-designated survey from the terminal device; a step of determining reliability of the survey result on the basis of external environment information at a survey point and the survey added to the survey result by the terminal device; and a step of carrying out a predetermined analysis on the basis of the collected survey result in consideration of the reliability.

Further another mode of the invention relates to a system for collecting a survey result from a terminal device connected via a network. The system includes: a collecting unit for collecting a survey result of a pre-designated survey from a terminal device; a determining unit for determining reliability of the survey result on the basis of external environment information at a survey point and the survey added to the survey result by the terminal device; an extracting unit for selecting a survey result on the basis of the reliability; and an output unit for outputting the selected survey result. With the configuration, the system can selectively output, for example, a survey result of high reliability.

Further another mode of the invention is a system of carrying out a predetermined analysis on the basis of a collected survey result. The system includes: a collecting unit for collecting a survey result of a pre-designated survey from a terminal device; a determining unit for determining reliability of the survey result on the basis of predetermined information which cannot be arbitrarily rewritten by an operator of the terminal device and which is added to the survey result by the terminal device; and an analyzing unit for carrying out a predetermined analysis on the basis of the collected survey result in consideration of the reliability. With the configuration, the system can carry out an analysis in consideration of reliability of a survey result.

The predetermined information may be position information of the terminal device obtained by a GPS unit provided for the terminal device. Thus, the system can determine reliability of a survey result on the basis of whether a survey is conducted at a pre-designated survey point or not.

An arbitrary combination of the components and a mode obtained by converting the expression of the invention among the method, apparatus, system, recording medium, computer program, and the like can be also effective as a mode of the invention.

BRIEF DESCRIPTION OF THE DRAWINGS

The above and other features and advantages will become more apparent from the following embodiment and appended drawings.

FIG. 4 is a diagram showing an example of a data structure in a log storing unit in FIG. 3.

FIG. 5 is a diagram showing an example of a data structure of a surveyor information database in FIG. 3.

FIG. 6 is a diagram showing an example of a data structure of a survey result file held in a survey result storing unit in FIG. 3.

FIG. 7 is a diagram showing an example of a data structure of a management table held in the survey result storing unit in FIG. 3.

FIG. 8 is a diagram showing an example of a data structure held in a determination file storing unit in FIG. 3.

DETAILED DISCLOSURE

Figure 1:
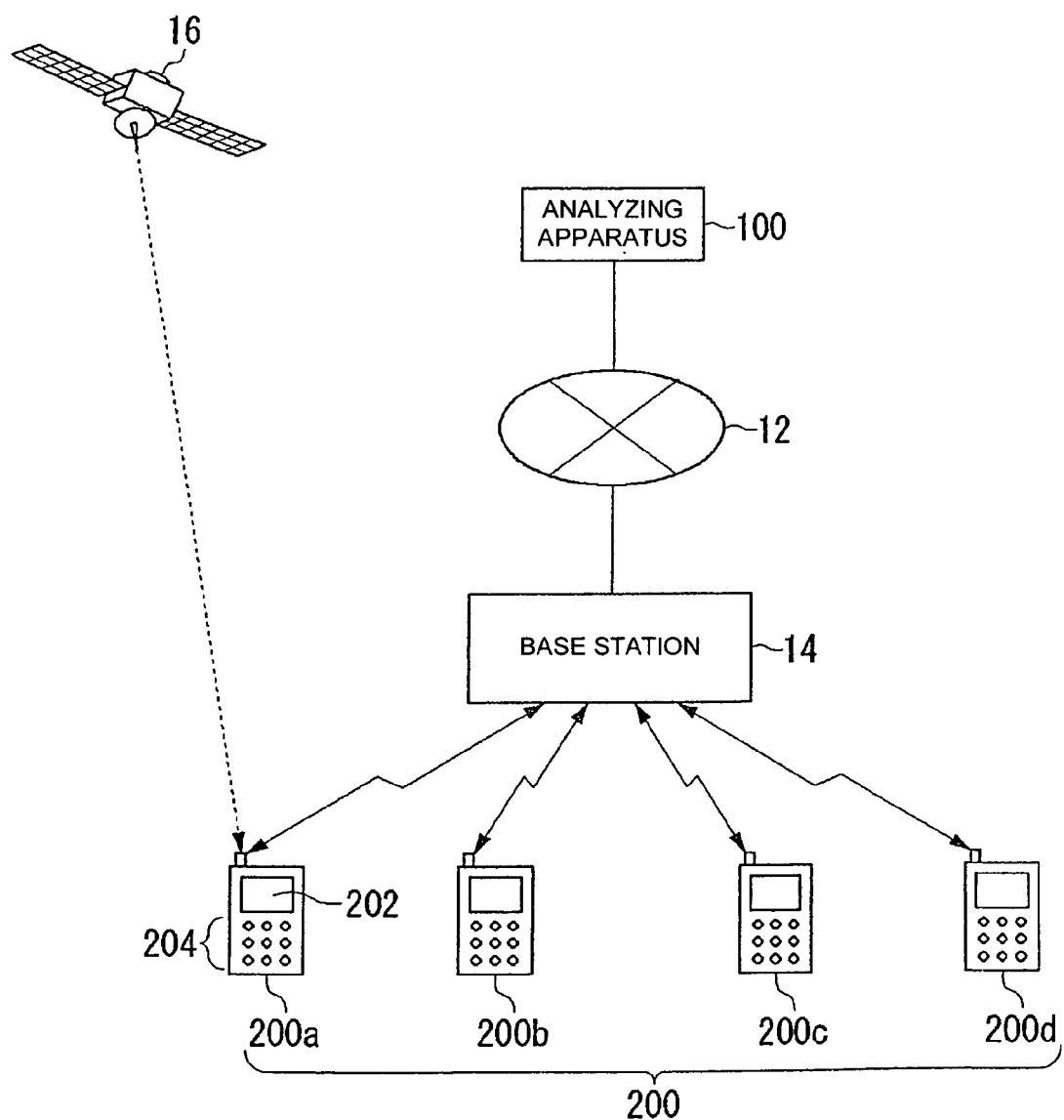
FIG. 1 is a configuration diagram of an analyzing system according to the embodiment.

FIG. 1 is a configuration diagram of an analyzing system 10 according to an embodiment. A first terminal device 200a, a second terminal device 200b, a third terminal device 200c, and a fourth terminal device 200d (hereinbelow, simply called "terminal devices 200") are portable terminals such as a cellular phone and a PDA. The terminal device 200 has, for example, a GPS (Global Positioning System) unit for receiving a GPS signal from a GPS satellite 16 to obtain position information, a CCD camera, a microphone, and the like. Each of the terminal devices 200 is connected to a network 12 via a base station 14 and performs communications with an analyzing apparatus 100.

The analyzing apparatus 100 provides a survey file for displaying survey information on a display 202 of the terminal device 200 to the terminal device 200 via the network 12. On the basis of the survey information displayed on the display 202, for example, a surveyor travels to a designated survey point while carrying the terminal device 200 and carries out a survey at the point. The terminal device 200 obtains position information at the point (hereinbelow, simply called "survey position information") by using the GPS unit. An instruction to obtain the information may be given on the basis of an instruction of the surveyor, given automatically by a program in the terminal device 200, or given on the basis of a signal from the outside. The surveyor captures an image of a designated object by using the CCD camera of the terminal device 200 and enters an item related to the survey information into the terminal device 200 by using an operation unit 204 such as key buttons.

The survey position information, image, and information obtained by the terminal device 200 other than information directly entered by the surveyor are used as not only a survey result but also information for determining reliability of the survey result. Specifically, data obtained from the GPS unit, CCD camera, microphone and the like of the terminal device 200 cannot be generally rewritten by the surveyor, so that it can be used as information for guaranteeing the reliability of the survey result. The terminal device 200 transmits, as survey results, the item entered by the surveyor, image obtained by each device, survey position information, and the like to the analyzing apparatus 100. The analyzing apparatus 100 collects the survey result, determines the reliability of each of the survey results and, after that, carries out a predetermined analysis. In such a manner, the analyzing apparatus 100 collects survey results with which the survey position information is associated from the plurality of terminal devices 200.

Figure 2:
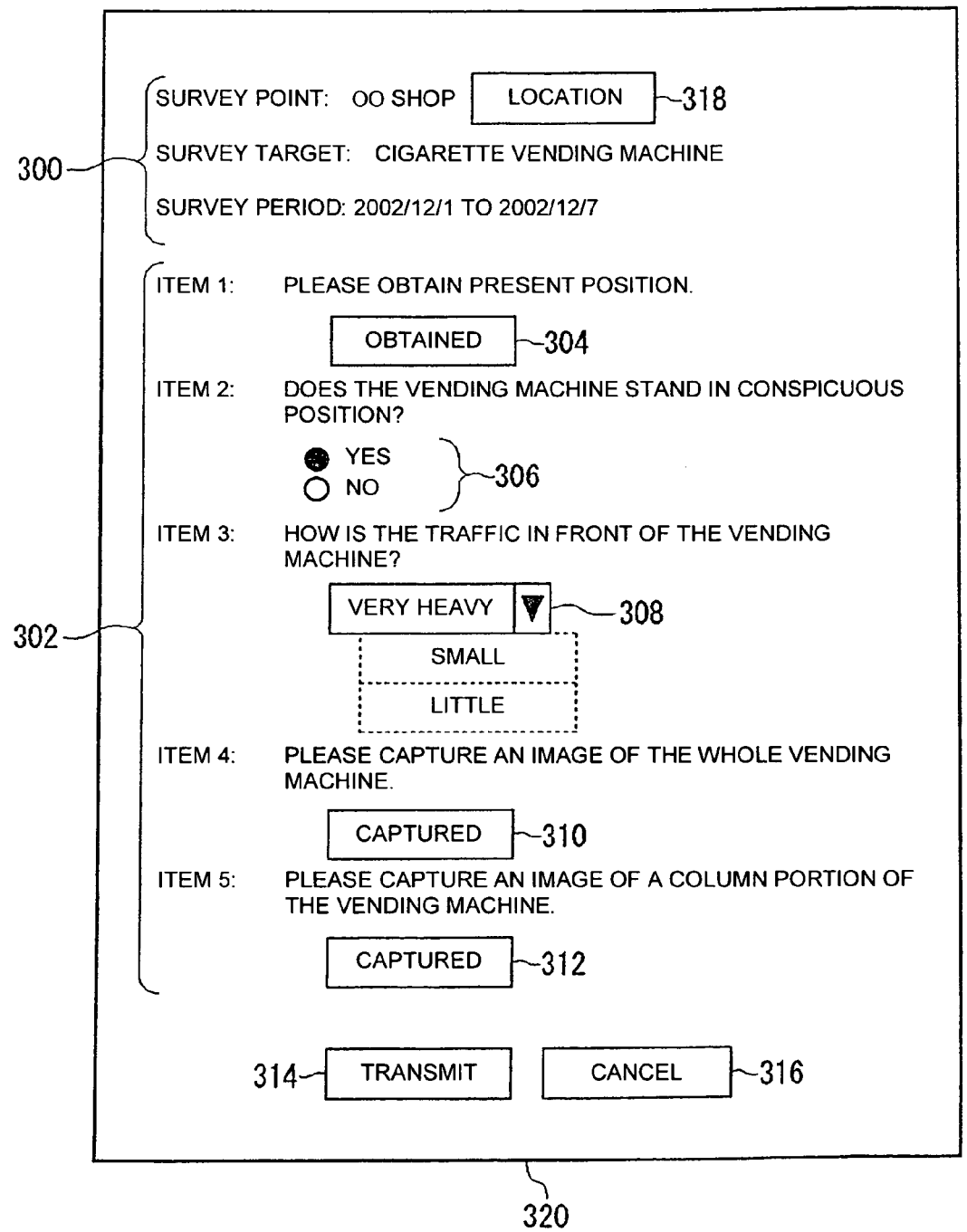
FIG. 2 is a diagram showing an example of a survey display screen displayed on a display of a terminal device in FIG. 1.

FIG. 2 is a diagram showing an example of a survey information display screen 320 displayed on the display 202 in FIG. 1. The survey information display screen 320 includes: a survey information display area 300 for displaying the outline of a survey; a survey item display area 302 for displaying detailed survey items; a transmission button 314 for transmitting a survey result; and a cancel button 316 for interrupting an entry of the survey information. In the survey information display area 300, information regarding the survey point such as the address, name, and the like of the survey point and information such as an object of the survey and a survey period is displayed. For example, as information regarding the survey point, the point or range as an object of the survey such as "xxx shop" or "the area around xxx station" is designated. In the embodiment, by clicking a fourth button 318, the detailed address, telephone number, and the like of the survey point are displayed.

In the survey item display area 302, a series of works in the survey are displayed for each item (hereinbelow, simply called "survey items"). In each of the survey items, a component according to input information is displayed. For example, "Item 1" is an item of instructing a work of obtaining survey position information by using the GPS unit. The work is automatically performed when the surveyor clicks a first button 304. "Obtained" indicated in the first button 304 in the diagram shows a state where the survey position information has been already obtained. Before the survey position information is obtained, "obtain" is indicated in the first button 304. The survey position information thus obtained cannot be arbitrarily forged or rewritten to another value by the surveyor. The survey information in the embodiment includes at least one piece of information which cannot be arbitrarily forged or rewritten by the surveyor. A second button 310 and a third button 312 are buttons for capturing an image of the object of survey by using the CCD camera. Like the first button 304, the buttons can be clicked before image capturing and cannot be clicked after image capturing. Characters indicated are switched from "capture" to "captured".

In "Item 2" and "Item 3", as components, radio buttons 306 and a combo box 308 are provided. By preparing the components according to input information, a typing error of the surveyor can be decreased, so that the quality of the survey result can be also increased in the terminal device 200. The operation can be easily performed even by a surveyor having a little experience. After finishing entry of all of survey items, the surveyor clicks the transmission button 314. By the click, the survey result is transmitted to the analyzing apparatus 100.

A survey information file for displaying such a survey information display screen 320 may be a program created in a programming language such as Java (trademark). The terminal device 200 receives the program from the analyzing apparatus 100 and executes it, thereby displaying the survey information display screen 320 on the display 202. Hereinbelow, the survey information display screen 320 displayed in such a manner will be called a "survey sheet", and data for displaying the survey sheet will be called a "survey information file".

Figure 3:
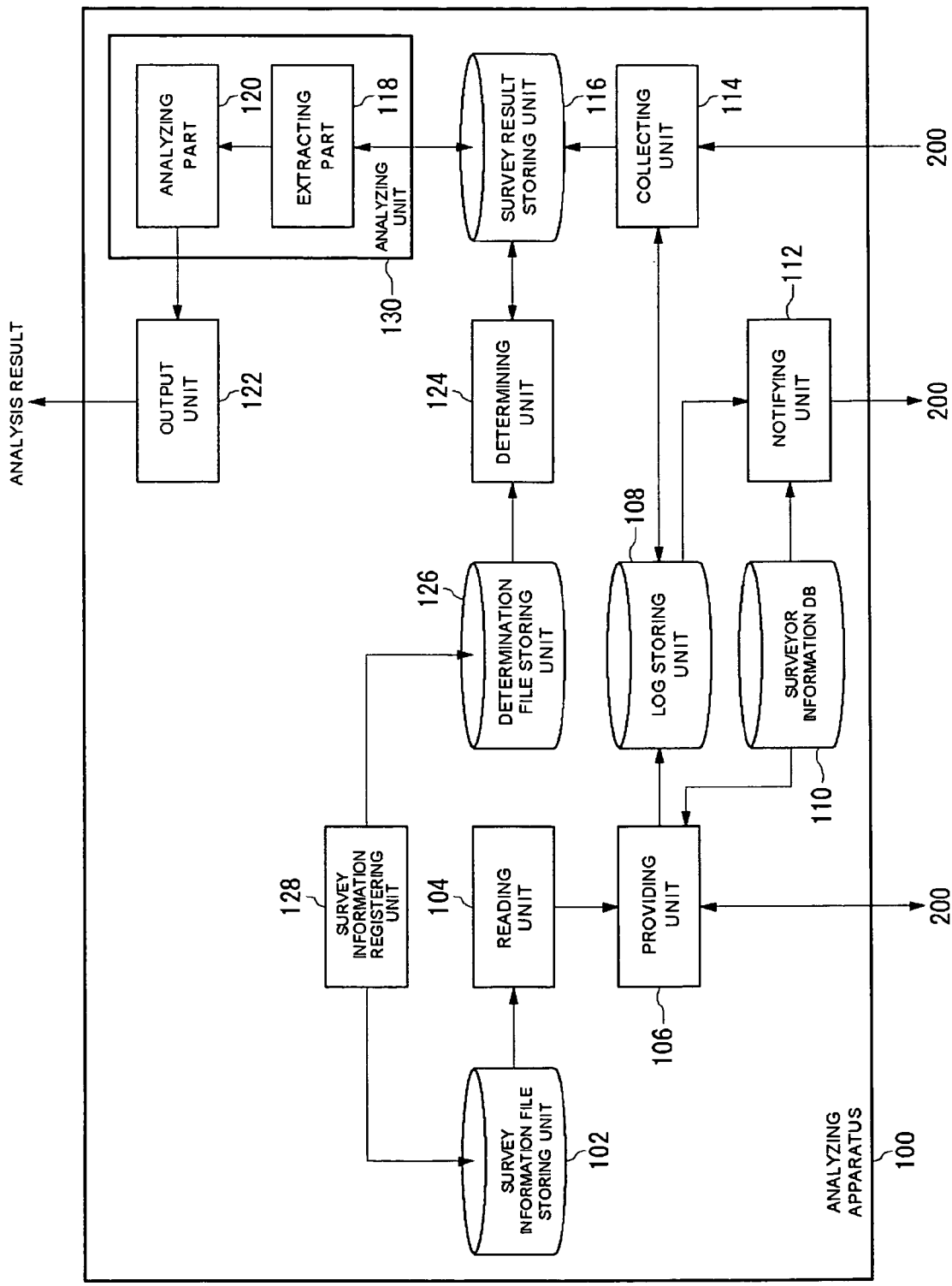
FIG. 3 is a diagram showing an example of the internal configuration of an analyzing apparatus in FIG. 1.

FIG. 3 is an internal configuration diagram of the analyzing apparatus 100 in FIG. 1. The components of the analyzing apparatus 100 are realized by an arbitrary combination of hardware and software such as a CPU of an arbitrary computer, a memory, a program realizing the components of FIG. 3 and loaded on the memory, a storing unit such as a hard disk for storing the program, and an interface for connection to a network. The person skilled in the art understands that there are various modifications in the realizing method and apparatus. In the diagrams described hereinbelow, not the configuration on the hardware unit basis but blocks on the function unit basis are shown.

A survey information registering unit 128 stores a survey information file into a survey information file storing unit 102 and stores information used at the time of determining reliability of a survey result (hereinbelow, simply called a "determination file") to a determination file storing unit 126. In the case where the survey information file is requested from the terminal device 200 in FIG. 1, a providing unit 106 performs authentication of the surveyor operating the terminal device 200 on the basis of data held in a surveyor information database 110. For example, the authentication is performed on the basis of identification information (hereinbelow, simply called a "terminal ID") assigned to each terminal device 200. In the case where authentication succeeds, the providing unit 106 instructs a reading unit 104 to read the survey information file. The reading unit 104 reads the survey information file from the survey information file storing unit 102 and supplies it to the providing unit 106. The providing unit 106 transmits the survey information file supplied from the reading unit 104 to the terminal device 200. On the basis of the survey information file transmitted, the survey information display screen 320 described by using FIG. 2 is displayed on the display 202 of the terminal device 200 in FIG. 1. Each time the survey information file is transmitted, the providing unit 106 stores a transmission history into a log storing unit 108.

FIG. 4 is a diagram showing an example of a data structure of the log storing unit 108 in FIG. 3. A sheet ID column 400 holds information identifying a survey information file, that is, information identifying a survey sheet (hereinbelow, simply called "sheet ID"). A surveyor ID column 402 holds information identifying a surveyor (hereinbelow, simply called "surveyor ID") as the owner of the terminal device 200 from which the survey information file is transmitted. A provision date and time column 404 holds date and time of transmission of the survey information file. A start date and time column 405 holds date and time when acceptance of a survey result generated on the basis of the transmitted survey information file starts. A time-limit date and time column 406 holds the time limit of accepting the survey result generated on the basis of the survey information file transmitted. For example, a collecting unit 114 in FIG. 3 which will be described later accepts survey results only in the period (hereinbelow, simply called "collecting period") determined by the dates and times held in the start date and time column 405 and the time-limit date and time column 406. A reception flag column 408 holds information indicating whether a survey result generated on the basis of the transmitted survey information file has been received or not (hereinbelow, simply called a "reception flag"). In the diagram, "1" denotes that a survey result is received, and "0" denotes that a survey result is not received. The reception flag is written by the collecting unit 114 in FIG. 3.

It is understood in FIG. 3 that the survey information file having the sheet ID "1051" is transmitted to the terminal device 200 of the surveyor having the surveyor ID of "36112" at "13:15 on Dec. 2, 2002". It is also understood that the period of collecting survey results generated on the basis of the survey information file is from "8:00 on Dec. 1, 2002" to "20:00 on Dec. 7, 2002". It is known that, by referring to the reception flag column 408, the analyzing apparatus 100 has already received a survey result generated on the basis of the survey information file.

FIG. 5 is a diagram showing an example of a data structure of the surveyor information database 110 in FIG. 3. A surveyor ID column 410 holds a surveyor ID. A terminal ID column 412 holds the terminal ID of the terminal device 200 of the surveyor. An e-mail address column 414 holds an e-mail address of the surveyor. A surveyor name column 416 holds the name of the surveyor. In addition to the data, the surveyor information database 110 may hold various information regarding the surveyor, such as the address, age, sex, and preferences of the surveyor. In another example, the providing unit 106 in FIG. 3 may selectively transmit a survey information file according to the sex, preferences, and the like of the surveyor.

Referring again to FIG. 3, a notifying unit 112 notifies of the fact that the time limit of accepting survey results draws near on the basis of the data held in the time-limit date and time column 406 in FIG. 4. The timing of notification may be preset or set for each survey information file. For example, when the timing is set two days before the time limit, the notifying unit 112 refers to the time-limit date and time column 406 in FIG. 4 and retrieves the surveyor ID of the surveyor who has downloaded the survey information file of two days before the date and time of the time limit. After that, the notifying unit 112 refers to the surveyor information database 110 on the basis of the surveyor ID and reads an e-mail address. The notifying unit 112 sends a notification to the e-mail address. The notifying unit 112 may notify only surveyors who have not transmitted survey results of the fact with reference to the reception flag column 408 in FIG. 4. In such a manner, the notifying unit 112 can urge the surveyor to transmit a survey result. It is also possible to preliminarily set the number of survey results to be collected. When the number of collected survey results does not reach the preset number, the notifying unit 112 may send the notification. In such a manner, the analyzing apparatus 100 can assure the number of survey results necessary for analysis.

The collecting unit 114 collects survey results from the terminal devices 200, for example, only for a collection period set in the log storing unit 108 and stores them into a survey result storing unit 116. The collecting unit 114 writes reception of the survey result into the log storing unit 108. By the operation, "1" is written as a reception flag into the reception flag column 408 in FIG. 4. The survey result storing unit 116 holds files collected as survey results, such as a survey result file, an image file, a video file, a sound file, and the like in a text format and a management table for managing the files. An analyzing unit 130 carries out a predetermined analysis on the basis of the survey results stored in the survey result storing unit 116. The analyzing unit 130 has an extracting part 118 for selecting a survey result used for an analysis and an analyzing part 120 for carrying out the analysis on the basis of the selected survey result.

FIG. 6 is a diagram showing an example of a data structure of a survey result file held in the survey result storing unit 116. The survey result file is recorded for each survey result, and a peculiar file name is added to the survey result file. A file name 468 of the survey result file in the diagram is "36112OOO.dat". The survey result file is in the XML (extensible Markup Language) format and holds input values of the survey items (hereinbelow, simply called "survey data"). The survey data is described in a range sandwiched by a survey result start tag 450a and a survey result end tag 450b. The survey result file is held in such a manner that each survey data is sandwiched by the start tag and the end tag. By employing the data structure, the analyzing apparatus 100 can flexibly deal with a plurality of pieces of different survey information. That is, a plurality of survey information pieces can be simultaneously handled by the single analyzing apparatus 100.

A surveyor ID column 452 holds the surveyor ID of a surveyor who provides a survey result. A sheet ID column 454 holds the sheet ID of a survey sheet based on which a survey result is generated. A survey date and time column 456 holds the date and time when the survey was conducted. A first item column 458, a second item column 460, a third item column 462, a fourth item column 464, and a fifth item column 466 hold survey data for survey items in the survey sheet. In the case of the diagram, the item columns hold survey data for the survey items in FIG. 2. For example, the first item column 458 holds position information of the terminal device 200 at the time of a survey, that is survey position information. The position information is expressed by, for example, latitude, longitude, altitude, and the like. The second item column 460 holds information selected with the radio button 306 in FIG. 2. The third item column 462 holds information selected in the combo box 308 in FIG. 2. The fourth and fifth item columns 464 and 466 hold file names of image files captured in the items 4 and 5 in FIG. 2.

Generally, the data structure of the XML format explained with reference to FIG. 6 is very flexible but it takes longer time for a process of retrieving data or the like as compared with the case of using a table having pre-fixed fields. The survey result storing unit 116 also holds a management table including, in a field, survey data used very frequently for processes at the post stage, out of the survey data included in a survey result. When the survey result is received, the collecting unit 114 writes necessary survey data into the management table.

FIG. 7 is a diagram showing an example of the data structure of a management table held in the survey result storing unit 116. A surveyor ID column 420 holds the surveyor ID of the surveyor who provided the survey result. The surveyor ID is the same as the data held in the surveyor ID column 452 in FIG. 6. A sheet ID column 422 holds the sheet ID of the survey sheet based on which a survey result is generated. The sheet ID is the same as the data held in the sheet ID column 454 in FIG. 6. A collection date and time column 424 holds the date and time when the collecting unit 114 in FIG. 3 collected the survey result. A position information column 426 holds survey position information. The survey position information is the same as the data held in the first item column 458 in FIG. 6. The survey date and time column 428 holds the date and time when the survey was conducted. The date and time is the same as the data held in the survey date and time column 456 in FIG. 6. A result file name column 430 holds the file name of the survey result file. The file name 468 in FIG. 6 is held in the result file name column 430. Consequently, on the basis of the management table, the survey result file in FIG. 6 can be referred to, that is, a relation is established.

A reliability column 432 holds information indicative of reliability (hereinbelow, simply called "reliability value"). The reliability value is written by a determining unit 124 in FIG. 3 which will be described later. In the diagram, "A" indicates high reliability, "B" indicates medium reliability, and "C" indicates low reliability. In another example, the reliability value may be expressed by a numerical value. Although the details will be described later, the extracting part 118 in FIG. 3 extracts a survey result having high reliability on the basis of the reliability value and supplies it to the analyzing part 120. An analysis flag column 434 holds information indicative of whether the survey result is used for an analysis or not (hereinbelow, simply called an "analysis flag"). The analysis flag is written by the extracting part 118 in FIG. 3 which will be described later. In the diagram, "1" denotes that the survey result is used for an analysis, and "0" denotes that the survey result is not used for an analysis.

Referring again to FIG. 3, the determining unit 124 determines reliability of each of the survey results held in the survey result storing unit 116 on the basis of the determining file held in the determination file storing unit 126, and writes the reliability value as the determination result into the reliability column 432 in FIG. 7.

FIG. 8 is a diagram showing an example of the data structure of the determination file storing unit 126. A sheet ID column 470 holds a sheet ID. A reliability determination data item column 472 holds survey items (hereinbelow, simply called "items to be determined") used at the time of determining reliability in the determining unit 124 in FIG. 3. The survey data of an item to be determined will be called "determination data". An ideal value column 474 holds an ideal value of the determination data, that is, an ideal value the determination data is to take. For example, in the case of a survey on a vending machine disposed in "OO shop" in a survey sheet described with reference to FIG. 2, an image of the vending machine captured on the basis of the survey sheet or the like is to be captured in the location of the "OO shop", that is, at the ideal value held in the ideal value column 474 or values around it. From the viewpoint, the determining unit 124 in FIG. 3 determines the reliability of the survey result. Information necessary for the determination is held in the determination file storing unit 126. In the diagram, an item to be determined which is used for determining the reliability of a survey result generated on the basis of the sheet ID "1051" is designated to be data held in the first item column 458 in FIG. 6, that is, the survey position information. It is understood that the ideal value of actual survey point information is the position information of the "OO shop".

A reliability value column 476 holds information for determining the reliability value in accordance with the difference between an ideal value held in the ideal value column 474 and the determination data held in the reliability determination data item column 472. For example, in the embodiment, the reliability value is expressed in three levels of "A", "B", and "C" and a range is set for each of the levels. For example, in the sheet ID "1051", the difference range of the reliability value "A" is set to "0 m to less than 5 m", that of the reliability value "B" is set to "5 m to less than 15 m", and that of the reliability value "C" is set to "15 m or larger". The determining unit 124 in FIG. 3 determines the reliability value of each of survey results held in the survey result storing unit 116 by using such information.

Although the survey position information is used as the item to be determined in the example of FIG. 8, in other examples, external environment information other than the position information such as an image captured at the survey point, sound sampled at the survey point, time of the survey, temperature at the survey point, humidity at the survey point, or altitude at the survey point may be used. The external environment information pieces may be combined and used as items to be determined. For example, in the case of surveying a traffic amount at a predetermined point, the survey position information and survey time may be set as items to be determined. According to the items to be determined, information held in the ideal value column 474 and the reliability value column 476 is properly set.

Referring again to FIG. 3, for example, at the collection time limit, the extracting part 118 selects a survey result used for analyzing the survey result from the survey result storing unit 116 and provides the selected survey result to the analyzing part 120. The extracting part 118 selects a survey result having a high reliability value. For example, when there are a plurality of survey results on the same survey sheet, the extracting part 118 selects the survey results in decreasing order of the reliability values. Therefore, a survey result having high reliability is positively selected as an object to be analyzed. The extracting part 118 may select a survey result having high reliability and of the latest survey date and time. The extracting conditions in the extracting part 118 can be arbitrarily set in accordance with survey information.

The analyzing part 120 carries out a predetermined analysis on the basis of the survey result supplied from the extracting part 118 and outputs the analysis result to an output unit 122. The details of the analysis are set according to the survey information. The output unit 122 may provide a survey result to a survey requester via a network or display the survey result on a display screen such as a monitor. The output unit 122 may output an analysis result in any output mode. In another example, the analyzing part 120 may output a survey result having high reliability selected by the extracting part 118 as it is without performing any analyzing process. Alternately, the analyzing part 120 may output a survey result and information used for determining reliability so as to associate them with each other.

Figure 9:
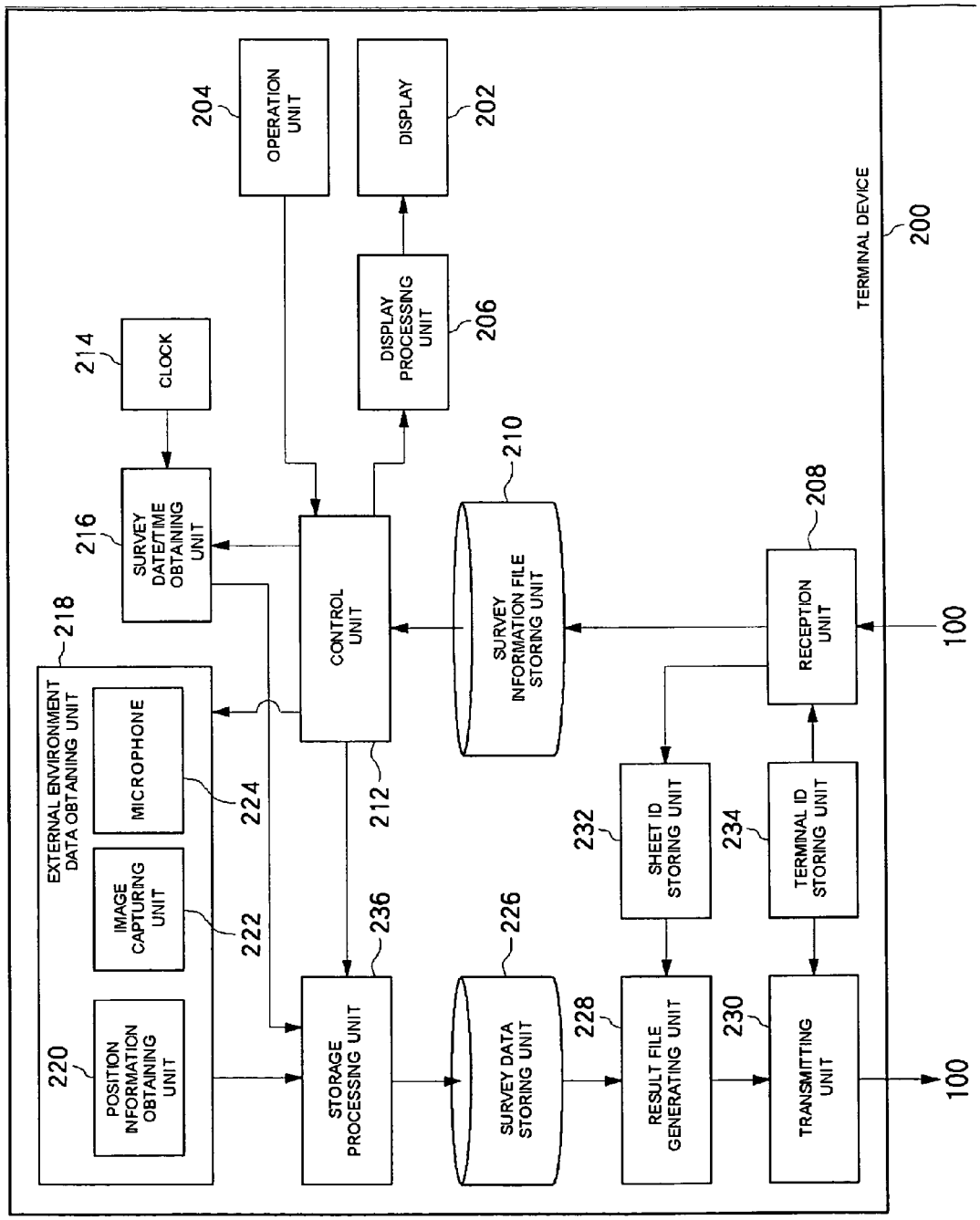
FIG. 9 is a diagram showing an example of the internal configuration of the terminal device in FIG. 1.

FIG. 9 is a diagram showing the internal configuration of the terminal device 200 in FIG. 1. A reception unit 208 receives a survey information file from the analyzing apparatus 100, stores the sheet ID into a sheet ID storing unit 232, and stores the survey information file into a survey information file storing unit 210. A control unit 212 controls the components on the basis of the survey information file. For example, the control unit 212 generates display data on the basis of the survey information file and outputs it to a display processing unit 206. On the basis of the display data, the display processing unit 206 displays the survey information display screen 320 in FIG. 2 on the display 202. The operation unit 204 is, for example, key bottoms, accepts an input of survey data from the surveyor, and outputs the input to the control unit 212. The control unit 212 associates the survey data with the survey item and supplies the resultant to a storage processing unit 236. The control unit 212 instructs a survey date/time obtaining unit 216 to obtain date and time of the survey and instructs an external environment data obtaining unit 218 to obtain external environment data.

The survey date/time obtaining unit 216 reads the present date and time from a clock 214 and supplies it to the storage processing unit 236. The external environment data obtaining unit 218 has a position information obtaining unit 220, an image capturing unit 222, and a microphone 224. In another example, the external environment data obtaining unit 218 may have a thermometer for measuring temperature, a hygrometer for measuring humidity, a barometer for measuring atmospheric pressure, and various sensors for measuring the gustatory sense, the sense of smell, the tactile sense, and the like. The sensors may be provided in the terminal device 200 or provided as detachable option devices. The position information obtaining unit 220 is, for example, a GPS unit and obtains position information of the terminal device 200 at the time point instructed from the control unit 212. The obtained position information is supplied as survey position information to the storage processing unit 236. The image capturing unit 222 is, for example, a CCD camera for capturing an image of an object to be surveyed and supplies image data of a still picture, a motion picture or the like to the storage processing unit 236. The microphone 224 samples sounds around the terminal device 200 and supplies sound data to the storage processing unit 236. The external environment data and survey date and time are used to determine the reliability of the survey result.

The storage processing unit 236 associates each of the survey data supplied from the control unit 212, survey date/time obtaining unit 216, and external environment data obtaining unit 218 with each of survey items and stores the resultant into a survey data storing unit 226. A result file generating unit 228 reads, for example, at the timing the transmission button 314 in FIG. 2 is clicked, the survey data held in the survey data storing unit 226 and the sheet ID held in the sheet ID storing unit 232 and generates a survey result file. A transmitting unit 230 transmits the generated survey result file to the analyzing apparatus 100. The terminal device 200 is constructed so that the surveyor cannot arbitrarily rewrite or forge the external environment data during the period since the external environment data obtaining unit 218 obtains external environment data until the survey result file is transmitted. For example, the storage processing unit 236 may encrypt external environment data, store the encrypted data into the survey data storing unit 226, and decode the data when the result file generating unit 228 generates a survey result file. Alternately, it may be that the surveyor cannot access data held in the survey data storing unit 226. By displaying the survey information display screen 320 in FIG. 2 by executing a program to carry out a survey in accordance with the screen, rewriting of the external environment data by a surveyor can be prevented. In another example, one screen is provided for one survey item, and a survey for each survey item may be carried out in a wizard form. At the time of receiving a survey information file and transmitting a survey result file, the reception unit 208 and the transmission unit 230 transmit the terminal ID held in the terminal ID storing unit 234 for authentication to the analyzing apparatus 100.

Figure 10:
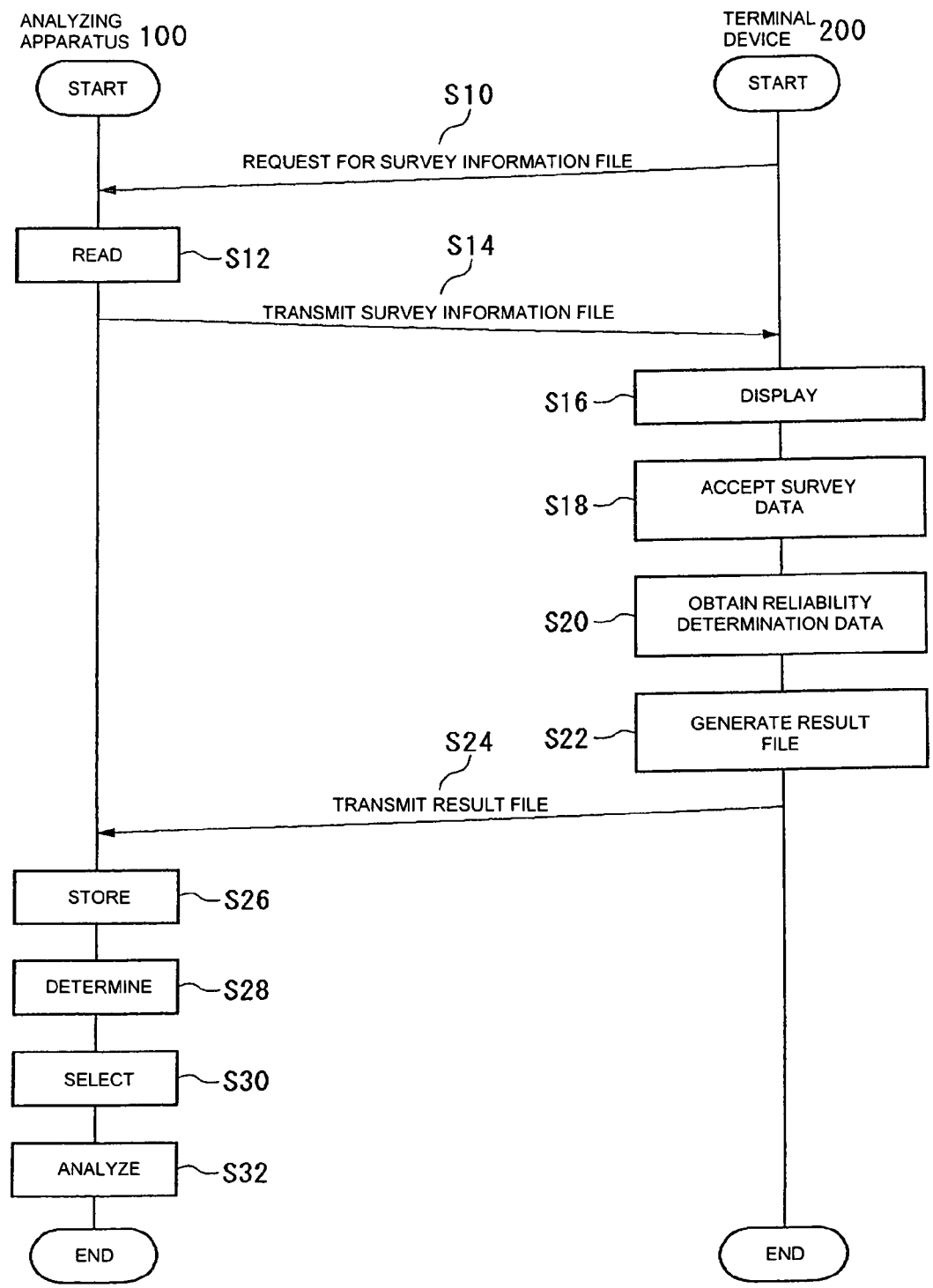
FIG. 10 is a diagram showing an example of a sequence of processes in the analyzing apparatus and the terminal device in FIG. 1.

FIG. 10 is a diagram showing an example of a sequence of processes performed between the analyzing apparatus 100 and the terminal device 200 in FIG. 1. First, the terminal device 200 requests the analyzing apparatus 100 for a survey information file (S10). The analyzing apparatus 100 reads out a survey information file (S12) and transmits it to the terminal device 200 (S14). Next, the terminal device 200 displays a survey sheet on the basis of the survey information file (S16). The terminal device 200 accepts an input of survey data according to the survey sheet from a surveyor (S18). The terminal device 200 obtains external environment information such as position information which is determination data used for determining reliability (S20). The terminal device

200 generates a survey result file (S22) and transmits it to the analyzing apparatus 100 (S24).

The analyzing apparatus 100 stores the survey result file into the survey result storing unit 116 in FIG. 3 (S26). The determining unit 124 in FIG. 3 determines reliability of the survey result (S28). For example, at the time limit of collection of survey results, the extracting part 118 in FIG. 3 selects a survey result of high reliability (S30). The analyzing part 120 in FIG. 3 carries out a predetermined analysis on the basis of the survey result selected by the extracting part 118 (S32).

By using the analyzing system 10, various surveys can be conducted. For example, the analyzing system 10 can be used for a survey on an arrangement state of a vending machine, a survey on a state of a traffic around the vending machine, a survey on an arrangement state of articles of a commodity display in the vending machine, a survey on the kind, position, and the like of an advertisement adhered to the vending machine, a survey on a commodity display state in a showcase at the back of a cash register in a convenience store or the like, a survey on a commodity display state in a showcase in a shop, a survey on a commodity display state in a refrigerator in a shop, a survey on the kind, position, and the like of an advertisement adhered in a station yard, a survey on the kind and position of an advertisement adhered to a vehicle such as a train, bus, or taxi, a survey on visibility of an advertisement placed in a town, a survey on a traffic amount, a survey on a traffic, a survey on a parking state in a parking, a survey on a people gathering state at a specific point such as an event hall, a survey on the flow of people in a shop, and the like. The analyzing system 10 can be also used for a survey on noise in a construction field, in a main road, around a train line, around an aerodrome, and the like.

The surveys are conventionally conducted by mainly using the visual sense, auditory sense, tactile sense, gustatory sense, and olfactory sense of a human. Since the five senses of an individual are used, variations occur in survey results. Consequently, in the analyzing system 10, image data of a still picture, a moving picture, or the like obtained by the CCD camera is used for surveys using the visual sense of a human, and sound data obtained by the microphone is used for surveys using the auditory sense of a human. For surveys using the tactile sense, gustatory sense, and olfactory sense, output data obtained by sensors necessary for the tactile sense, gustatory sense, and olfactory sense, respectively, is used. By replacing the parts depended on the five senses of a human with devices corresponding to the five senses, variations in the survey results can be suppressed, and objective survey results can be obtained.

The analyzing system 10 is particularly adapted to a survey carried out in such a manner that a surveyor travels to a predetermined survey point, carries out various surveys, and collects and analyzes the survey results. Surveys of a type in which a surveyor travels are left to the initiative of the surveyor in many points. For example, there may be a surveyor who does not travel to the survey point but transmits survey items which are input with his/her imagination as a survey result. The analyzing system 10 can eliminate improper survey results of such a surveyor from the analysis. Since such a surveyor can be grasped, warning can be given to the surveyor, and an effect of suppressing transmission of an improper survey result is produced.

The invention has been described above on the basis of the embodiment. The embodiment is an example, and a person skilled in the art understands that various modifications of combinations of components and processes are possible and are within the scope of the present invention. Such modifications will be described below.

Figure 11:
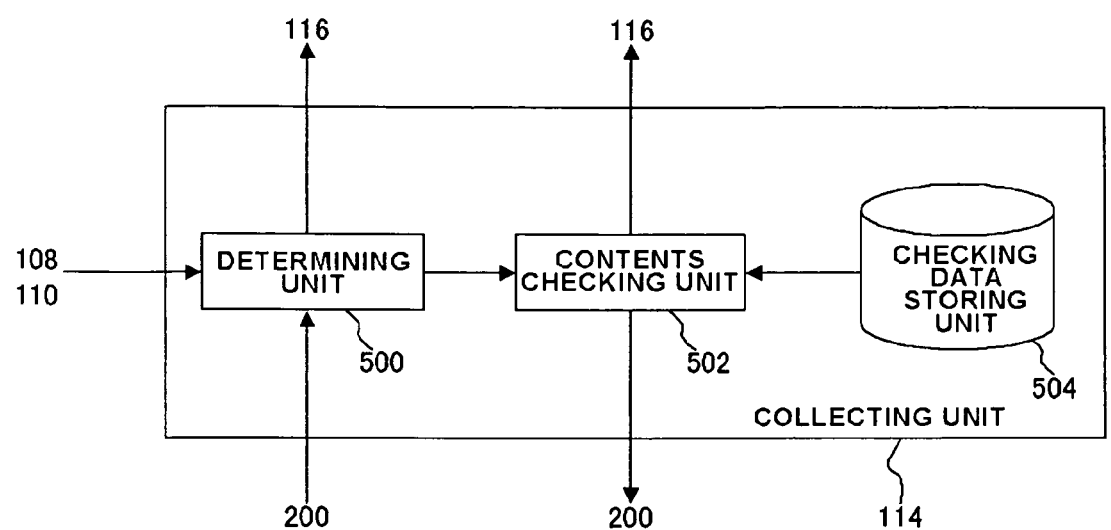
FIG. 11 is a diagram showing an internal configuration of a collecting unit in another example.

A first modification relates to the collecting unit 114 in FIG. 3. FIG. 11 is a diagram showing the internal configuration of the collecting unit 114 in the first modification. Although the details will be described later, the collecting unit 114 checks the contents of a survey result which is accepted in accordance with a predetermined condition. If the contents have any imperfection, the collecting unit 114 requests for a correction to the surveyor. A determining unit 500 determines whether the contents of the survey result are to be checked or not on the basis of predetermined conditions such as the attribute of the surveyor, the kind of the survey, and the like. In the embodiment, two attributes are set as the attributes of the surveyor, and the determining unit 500 stores a survey result of a surveyor having the first attribute as it is into the survey result storing unit 116 and outputs a survey result from a surveyor having the second attribute to a contents checking unit 502. The surveyor information database 110 in FIG. 3 holds the attributes for each of surveyors. The determining unit 500 specifies a surveyor of an accepted survey result with reference to the log storing unit 108 in FIG. 3 and specifies the attribute of the surveyor with reference to the surveyor information database 110. Predetermined conditions can be arbitrarily set. The determining unit 500 may determine, for example, whether the process of checking a survey result is executed or not for each survey contents or whether the process of checking a survey result is executed or not for each of surveyors.

The contents checking unit 502 checks the contents of a survey result on the basis of input values for survey items included in the survey result. The contents checking unit 502 may perform the checking process on all of the survey items or only a predetermined survey item. For example, survey items to be checked may be survey items whose input values such as shop name, commodity name, and address can be estimated, and which are included in a survey result. A checking data storing unit 504 holds data for checking on the survey item which can be estimated. For example, in the checking data storing unit 504, candidates of a value to be input are held as checking data for each predetermined survey item. Consequently, the contents checking unit 502 can determine whether there is an error in the contents of a survey result or not by determining whether the checking data which is the same as the input value is held in the checking data storing unit 504 or not.

In the case where there is an error in a survey result, the contents checking unit 502 notifies the terminal device 200 of the fact and requests for correcting the survey result. In the case where there is no error in the survey result, the contents checking unit 502 stores the survey result into the survey result storing unit 116.

By selectively executing the checking process on the basis of a predetermined condition, a survey result can be collected effectively in accordance with the contents of a survey, the purpose of a survey, the character of a survey, and the like. For example, in the case where the size of population of the survey is small, an influence exerted on an analysis result of each survey result is large, so that a condition may be set so as to check the contents of a survey result on collection of the survey result. In the case where the size of population is large and the number of survey results collected is enormous, the influence exerted on the analysis result of each survey result is small, so that a condition may be set so as not to check the contents of the survey result.

A second modification relates to the terminal device 200 in FIG. 9. The external environment data obtaining unit 218 in FIG. 9 may have not only the various sensors but also an input device such as a bar code reader, a touch panel, and a fingerprint reader, and a communication device for collecting information from an external device by wire or by radio. The external environment data obtaining unit 218 may have all or part of the various sensors, input device, and communication device. The terminal device 200 stores various survey data obtained by the external environment data obtaining unit 218 into the survey data storing unit 226.

Generally, the functions of a cellular phone vary among models. On the other hand, the kind of external environment data to be obtained varies according to a survey. According to a survey, the analyzing apparatus 100 in FIG. 3 selects the terminal device 200 having the external environment data obtaining unit 218 necessary for conducting the survey and provides a survey information file. Concretely, the surveyor information database 110 in FIG. 3 has information for specifying the kind of the external environment data obtaining unit 218 which can be used for the survey such as the model and serial number of the terminal device 200 used by the surveyor and kinds of the various sensors, input device, and communication device.

The survey information file storing unit 102 holds information for specifying the function to be provided for the terminal device 200 to carry out the survey for each survey information file. In the embodiment, the survey information file storing unit 102 holds the model of the terminal device 200 for each survey information file. On the other hand, the surveyor information database 110 holds, for each surveyor, the model of the terminal device 200 used for a survey by the surveyor. At the time of providing the survey information file to the terminal device 200, the providing unit 106 in FIG. 3 reads the model of the terminal device 200 to which the survey information file is to be provided, and reads the survey information file adapted to the model from the survey information file storing unit 102 via the reading unit 104. In such a manner, the survey information file adapted to the terminal device 200 of the surveyor can be provided.

A third modification relates to the determining unit 124 in FIG. 3. The determining unit 124 determines the reliability of a survey result by using the external environment information obtained by the terminal device 200 in FIG. 9. Alternately, the determining unit 124 may determine the reliability on the basis of, not the information obtained by the terminal device 200 but information indirectly obtained such as data communication history and communication fare of the terminal device 200. For example, in the case where the determining unit 124 determines the reliability on the basis of indirect information such as data communication history and communication fare, the determining unit 124 accepts the indirect information from a telecommunications carrier. The determining unit 124 determines the reliability of the survey result by comparing data communication timings, date and time the survey information is provided, date and time the survey result is received, and the like.

In another example, the determining unit 124 may determine not the reliability of each survey result but the reliability of a plurality of survey results in a lump. For example, in the case where travel is made for each survey, the determining unit 124 determines the reliability of a survey result by comparing an ideal travel distance between a plurality of survey points with an actual travel distance of the surveyor. For example, in the case where a distance obtained by linearly connecting ten survey points on a map is 10 km and an actual travel distance of the surveyor obtained from position information included in the survey result is 2 km, it is determined that the possibility that the surveyor did not carry out the survey properly is high. By determining the reliability of a plurality of survey results in a lump, the reliability is determined efficiently. By setting a method of determining reliability on a survey unit basis, the reliability is determined properly from the viewpoint of efficiency in accordance with the characteristic of the survey. Concretely, the survey information file storing unit 102 in FIG. 3 holds a reliability determining method for each survey information file. The determining unit 124 determines the reliability of a survey result corresponding to the survey by the determining method which is set in the survey information file.

A fourth modification relates to the terminal device 200 in FIG. 9. The terminal device 200 has the function of transmitting a plurality of survey results in a lump to the analyzing apparatus 100. By the function, for example, in the case where a survey point is out of a communicatable range, that is, out of coverage, the surveyor stores survey results and transmits them in a lump in the coverage. On receipt of a transmission instruction from the surveyor, the result file generating unit 228 in FIG. 9 generates a list of the survey results stored in the survey data storing unit 226 in FIG. 9. The list is displayed on the display 202 in FIG. 9. With reference to the list, the surveyor checks the details and gives a final transmission instruction. Since survey results can be stored, a survey can be also conducted in a place which is out of the coverage. By displaying a list before transmission, a chance to check survey results and correct them can be given to the surveyor. Thus, it can be expected that a typing error included in a survey result can be suppressed.

A fifth modification relates to the collecting unit 114 in FIG. 3. Generally, in the case of managing data by using a database, a field as a key exists in each record. In the case of conducting a survey on commodities handled in a shop, a survey result is managed as a record using the shop ID for identifying the shop as a key. Consequently, to analyze a survey result on the basis of the record, accuracy of the key is demanded. However, information as a key is, for example, a sequence of alphanumeric characters and is a character train which is difficult to remember for the surveyor. There is a case that the surveyor erroneously enters information as a key even if he/she pays attention. The collecting unit 114 of the modification specifies the key on the basis of position information of the survey point obtained by the position information obtaining unit 220 in FIG. 9 and automatically adds it to the survey result. It becomes unnecessary for the surveyor to enter information as a key, so that a typing error of information as a key does not occur.

For example, the collecting unit 114 associates the shop ID and the shop place with each other and holds the resultant as a shop information table. In the case where the survey result is accepted, the collecting unit 114 specifies a shop within a predetermined range from the position information included in a survey result with reference to the shop information table. The collecting unit 114 adds the shop ID of the specified shop to the survey result. Since the collecting unit 114 preliminarily holds the information for specifying the key on the basis of the external environment information in a table, the collecting unit 114 can automatically add the key to the survey result.

A sixth modification relates to the terminal device 200 in FIG. 9. The terminal device 200 has the function of notifying the analyzing apparatus 100 in FIG. 3 of the fact that a survey result including a typing error is transmitted from the surveyor. On the basis of the notification, the analyzing apparatus 100 performs, for example, a process of sending a reply indicative of reception of the notification, a process of eliminating a survey result including a typing error from an object to be analyzed, and the like. A surveyor always pays attention to conduct an accurate survey. Consequently, when a survey result including a typing error is transmitted, the surveyor is sensible of his/her responsibility and feels heavy. By providing the function of notifying of a typing error, while respecting the responsibility of the surveyor for a survey, the surveyor can be mentally supported.

A seventh modification relates to the analyzing unit 130 in FIG. 3. The analyzing unit 130 may analyze the reliability of a survey result for each surveyor on the basis of a survey result held in the survey result storing unit 116. For example, a surveyor who tends to give a survey result of low reliability may be extracted.

INDUSTRIAL APPLICABILITY

According to the invention, survey results can be collected from a plurality of terminal devices. On the basis of a survey result having high reliability, a predetermined analysis can be conducted.

The invention claimed is:

1. An analyzing system comprising:
a collecting unit for collecting a survey result of a pre-designated survey from a terminal device, said survey result collected from the terminal device including external environment information of a survey point and said survey, wherein said survey includes responses, entered by a user, to a plurality of questions;
a determination file storing unit for storing ideal information;
a determining unit for determining reliability of the survey result on the basis of said external environment information at said survey point added to said survey result by said terminal device by comparing said external environment information to the stored ideal information; and
an analyzing unit for carrying out a predetermined analysis on the basis of the collected survey result in consideration of said reliability.

2. The analyzing system according to claim 1, wherein said analyzing unit comprises:
an extracting part for selecting a survey result to be analyzed on the basis of said reliability; and
an analyzing part for carrying out said analysis on the basis of the selected survey result.

3. The analyzing system according to claim 2, wherein when a plurality of survey results exist for the same survey, said extracting unit selects a survey result of high reliability.

4. The analyzing system according to claim 1, wherein said external environment information is survey position information specifying the position of said terminal device at the time point when said survey is conducted.

5. The analyzing system according to claim 4, wherein said survey includes survey target position information specifying a target point of a survey, and
said determining unit determines reliability of said survey result on the basis of said survey target position information and said survey position information.

6. The analyzing system according to claim 1, further comprising a providing unit for transmitting said survey to said terminal device.

7. A method of carrying out a predetermined analysis by using a system including an analyzing apparatus for carrying out an analysis on the basis of a survey result collected from a terminal device connected via a network, comprising:
storing ideal information
collecting a survey result of a pre-designated survey from the terminal device, said survey result collected from the terminal device including external environment information of a survey point and said survey, wherein said survey includes responses, entered by a user, to a plurality of questions;
determining reliability of the survey result on the basis of said external environment information at said survey point added to said survey result by said terminal device by comparing the ideal information with said external environment information; and
carrying out a predetermined analysis on the basis of the collected survey result in consideration of said reliability.

8. A survey result collecting system comprising:
a collecting unit for collecting a survey result of a pre-designated survey from a terminal device, said survey result collected from the terminal device including external environment information of a survey point and said survey, wherein said survey includes responses, entered by a user, to a plurality of questions;
a determination file storing unit for storing ideal information;
a determining unit for determining reliability of the survey result on the basis of said external environment information at said survey point added to said survey result by said terminal device by comparing said external environment information to the ideal information;
an extracting unit for selecting a survey result on the basis of said reliability; and
an output unit for outputting the selected survey result.

9. An analyzing system comprising:
a collecting unit for collecting a survey result of a pre-designated survey from a terminal device, wherein said survey result includes responses, entered by a user, to a plurality of questions;
a determination file storing unit for storing ideal information;
a determining unit for determining reliability of the survey result on the basis of predetermined information which cannot be arbitrarily rewritten by an operator of said terminal device, and which is added to said survey result by said terminal device, the reliability being determined by comparing said predetermined information with the ideal information; and
an analyzing unit for carrying out a predetermined analysis on the basis of the collected survey result in consideration of said reliability.

10. The analyzing system according to claim 9, wherein said predetermined information is position information of said terminal device obtained by a GPS unit provided for said terminal device.

11. An analyzing system comprising:
a providing unit for providing a program which is adapted to specification of a terminal device and can be executed in said terminal device to said terminal device via a network;
a determination file storing unit for storing ideal information;
a collecting unit for collecting a survey result which is obtained by executing said program in said terminal device and includes external environment information of said terminal device and responses, entered by a user, to a plurality of questions, said survey result collected from said terminal device via said network; and
a determining unit for determining reliability of a survey result on the basis of said external environment information included in said survey result, wherein reliability of the survey result is determined by comparing the external environment information to the ideal information.

12. The analyzing system according to claim 11, further comprising a survey information file storing unit for storing a plurality of programs prepared for respective surveys,
wherein on the basis of specifications of said terminal device, said providing unit reads a program of a survey corresponding to the specifications from said survey information file storing unit and provides it to said terminal device.

13. The analyzing system according to claim 11, wherein said collecting unit stores external environment information included in said survey result and an ideal value to be obtained in said survey result so as to be associated with each other.

14. The analyzing system according to claim 11, further comprising:
an analyzing unit for carrying out a predetermined analysis on the basis of a collected survey result in consideration of the reliability of the collected survey result.

15. The analyzing system according to claim 14, further comprising:
a survey result storing unit for storing said survey result; and
an extracting unit for selecting a survey result to be analyzed from said survey result storing unit on the basis of said reliability,
wherein said analyzing unit carries out a predetermined analysis on the basis of the selected survey result.

16. The analyzing system according to claim 15, wherein said terminal device presents a survey by executing said program,
said survey result includes position information of said terminal device when said survey is presented and external environment information different from said position information, which is obtained by an external environment data obtaining unit of said terminal device when said survey is presented, and
said survey result storing unit stores said position information and said external environment information so as to be associated with each other.

17. The analyzing system according to claim 15, wherein said terminal device presents a survey by executing said program,
said survey result includes position information of said terminal device when said survey is presented and an image captured by said terminal device when said survey is presented, and
said survey result storing unit stores said position information and said image so as to be associated with each other.

18. The analyzing system according to claim 11, wherein said collecting unit specifies a key for database management on the basis of said external environment information included in said survey result and adds the specified key to the survey result.

19. The analyzing system according to claim 11, wherein said collecting unit accepts survey results of a survey until a predetermined time limit which is set for each survey.

20. The analyzing system according to claim 19, further comprising:
a log storing unit for managing a survey a surveyor takes charge of on a surveyor unit basis; and
a notifying unit for, when the remaining period to said time limit becomes shorter than a predetermined period, sending a notification of urging a surveyor in charge of the survey to transmit a survey result to the surveyor.

* * * * *